(12) United States Patent
Immonen et al.

(10) Patent No.: US 7,010,305 B2
(45) Date of Patent: Mar. 7, 2006

(54) METHOD FOR ASSIGNING VALUES OF SERVICE ATTRIBUTES TO TRANSMISSIONS, RADIO ACCESS NETWORKS AND NETWORK ELEMENTS

(75) Inventors: Jukka Immonen, Arlington, MA (US); Juha Ala-Laurila, Tampere (FI); Jarkko Jouppi, Tampere (FI); Juha Kalliokulju, Vesilahti (FI); Kari O. Virtanen, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 696 days.

(21) Appl. No.: 09/808,616

(22) Filed: Mar. 14, 2001

(65) Prior Publication Data

US 2002/0132611 A1    Sep. 19, 2002

(51) Int. Cl.
*H04Q 7/20*    (2006.01)
(52) U.S. Cl. .................................. 455/452.2; 455/423
(58) Field of Classification Search ............. 455/452.2, 455/403, 422.1, 424, 425, 509, 414.1, 67.13, 455/423
See application file for complete search history.

(56) References Cited

U.S. PATENT DOCUMENTS

| 6,668,175 | B1 * | 12/2003 | Almgren et al. | ............ 455/522 |
| 2002/0077097 | A1 * | 6/2002 | Mizell et al. | ............... 455/423 |

FOREIGN PATENT DOCUMENTS

| EP | 0946008 A2 | 9/1999 |
| EP | 0969683 A1 | 1/2000 |
| EP | 0973352 A2 | 1/2000 |
| WO | WO 01/28160 A2 | 4/2001 |

OTHER PUBLICATIONS

"3GPP TS 23.060 V3.4.0", 3rd Generation Partnership Project, Technical Specification Group Services and System Aspects, General Packet Radio Service (GPRS), Service description, Stage 2, Release 1999.
"3GPP TS 23.107 V3.4.0", 3rd Generation Partnership Project, Technical Specification Group Services and System Aspects, QoS Concept and Architecture, Release 1999.
"3GPP TS 25.413, V3.4.0", 3rd Generation Partnership Project, Technical Specification Group Radio Access Network, UTRAN Iu Interface RANAP Signalling, Release 1999.
3GPP TS 24.008, V3.6.0, 3rd Generation Partnership Project, Technical Specification Group Core Network, Mobile Radio Interface Layer 3 Specification, Core Network Protocols, Stage 3, Release 1999.
UMTS Standard, 3G TS 23.060 v3.4.0, relevant p. 161.
3GPP TS 23.107 v3.4.0, (Jul. 2000); "3rd Generation Partnership Project; Technical Specification Group Services and System Aspects; QoS Concept and Architecture, Release 1999," relevant pp. 13-24.

* cited by examiner

Primary Examiner—Ovidio Escalante
(74) Attorney, Agent, or Firm—Perman & Green, LLP

(57) ABSTRACT

The invention relates to a method and to associated radio access networks and network elements for assigning values of service attributes to transmissions between a user equipment and a radio access network. In order to allow for an improved assignment of values of service attributes, it is proposed that, upon request of such a transmission by a user equipment of a subscriber registered with some radio access network the method comprises determining values of service attributes that are to be used for the transmission requested by said user equipment based on at least one value of at least one service attribute defined by a stored subscriber specific service profile, and based on at least one stored common value of at least one service attribute.

14 Claims, 4 Drawing Sheets

METHOD FOR ASSIGNING VALUES OF SERVICE ATTRIBUTES TO TRANSMISSIONS, RADIO ACCESS NETWORKS AND NETWORK ELEMENTS

FIELD OF THE INVENTION

The invention relates to a method for assigning values of service attributes to transmissions between a user equipment and a radio access network. The invention equally relates to such radio access networks and to network elements of such networks.

BACKGROUND OF THE INVENTION

Radio access networks enable wireless transmissions of information to and from user equipment. Each transmission is carried out with a variety of service attributes of values that have to be determined for the transmission. The term radio access network is used in this document to denote a complete network that can be accessed by radio connections, e.g. a whole cellular network, the core network parts inclusive.

In future radio access networks, sophisticated service control mechanisms, like the control of the Quality of Service (QoS) provided for each transmission, can play an important role. Such service control mechanism can be used for differentiating between different applications, like real-time versus non-real-time applications, or between different user groups, e.g. business versus low-budget users. In 3G ($3^{rd}$ generation) networks, the provision of a certain QoS and a QoS-based billing is an inherent part of the service models. Service control mechanisms are realized by varying the values of attributes used for a transmission.

A customer can register user equipment for a specific radio access network In order to enable service control mechanisms, in addition a subscriber specific service profile has to be agreed upon. Such a service profile defines e.g. the quality of service that is allowed or guaranteed for transmissions between the user equipment and the network, and depends usually on what the customer is willing to pay for these transmissions. More specifically, the subscribed service profile contains or refers to values of different service attributes that characterize the quality of a transmission. The values defined by the subscribed service profile can be used for all transmissions to and from the respective user equipment. Alternatively, the user equipment is allowed to request for each transmission values for the required service attributes that are below or equal to the level of the subscribed values of attributes. For the case that a transmission is requested without explicit indication of desired values for the required service attributes, default attributes have to be provided.

There is a considerable number of service attributes that may have to be determined for each connection. For UMTS (Universal Mobile Telecommunications System), QoS attributes have been specified in 3GPP TS 23.107 V3.4.0 (2000-07); "3rd Generation Partnership Project; Technical Specification Group Services and System Aspects; QoS Concept and Architecture; Release 1999". All transmissions are distributed to four different classes of traffic, a conversational class, a streaming class, an interactive class and a background class. The main distinguishing factor between these classes is how delay sensitive the traffic is. The conversational class is meant for traffic which is very delay sensitive while the background class is the most delay insensitive traffic class. Conversational class and streaming class are mainly intended to be used to carry real-time traffic flows. An example for conversational class traffic is voice and an example for streaming class traffic is streaming video. Interactive class and background class are mainly intended to be used to carry non-real-time traffic flows. An example for interactive class traffic is web browsing and an example for background class traffic is background download of emails. The standard defines which attributes have to be defined for which class and also gives value ranges for the different service attributes.

According to the standard, for each of the four classes the maximum bitrate, the delivery order, the maximum SDU (Service Data Unit) size, the SDU error ratio, the residual BER (Bit Error Ratio), the delivery of erroneous SDUs, and the allocation/retention priority have to be fixed. An indication of the traffic class itself also forms one of the attributes required for all classes. For the conversational class and the streaming class an SDU format information, a transfer delay and a guaranteed bitrate have to be determined in addition. For the interactive class a traffic handling priority (THP) has to be determined in addition.

All subscribed attributes are currently stored together with other information in the HLR/HSS (Home Location Register/Home Subscriber Server) of the user equipment in the radio access network,with which the user equipment is registered. The mentioned UMTS standard does not clearly define, however, how the QoS attributes stored in the HLR/HSS are to be taken in to account when deciding the attribute set that is to be used for a specific connection. The standard only specifies that one QoS profile is stored for each customer subscription. The user equipment can then request specific values of service attributes, the subscribed profile defining the upper limits for the provided service. To be able to use services with a high transmission quality, a user has therefore to subscribe a QoS profile with values of service attributes that enable a high quality.

The standard proposes to use the subscribed profile as well as default QoS profile. The disadvantage of such an approach is that even if a customer does not require any specific values of attributes for some traffic stream, a possibly high subscribed QoS profile is used without need.

Another problem arises from an approach proposed in UMTS standard, 3G TS 23.060, version 3.4.0. According to this standard it is possible for user equipment to leave some of the QoS attributes undefined in a PDP (Packet Data Protocol) context activations However, the standard does not define any functionality that would enable a network to intelligently evaluate the user-defined QoS attributes when determining the rest of the attributes. The missing attributes are simply fetched from HLR/HSS. This may lead to a situation where there is a conflict between the requested and the fetched QoS attributes. Such a conflict is given for example, if a very low delay is requested by the user equipment, which is essential for real-time traffic, and a very good subscribed packet error rate, which would only be essential for non-real-time traffic, is fetched from the HLR/HSS. Such a combination of attributes is impossible to implement.

Further problems in assigning values of service attributes to requested transmissions arise from the fact that a user of a user equipment is not necessarily confined to requesting a connection in the radio access network in which the equipment is registered. In particular in local wireless hotspots, like in hotels and airports, a locally restricted radio access network may be provided for connections to the public internet or to a corporate network Such a wireless access network can be realized for example as wireless local area network (WLAN). A user equipment can access the local radio access network, if it is owned equally by the operator of the radio access network with which the user equipment is registered, or if it is owned by another operator having a roaming agreement with the operator of said radio access network with which the user equipment is registered.

Each user equipment is equipped with a smart card, such as a GSM (Global System for Mobile communication) Subscriber Identification Module (SIM), which contains information needed for user authentication and billing in a public radio access network, in particular a cellular network, in which the respective user equipment is registered. The operator of the public radio access network, e.g. a GSM or 3G network, may offer broadband wireless services additionally in a local radio access network, e.g. a WLAN, for the cellular users by utilizing the existing cellular infrastructure for user authentication and billing. The authentication and billing information is carried between the local radio access network and the public radio access network through gateways. Proprietary protocols take care of the signaling between the different network elements.

In conventional WLANs, all users receive a similar service from the network, the so called "best-effort service". This service simply provides means to the user equipment to send traffic to and receive traffic from the network. This approach, however, does not allow to provide different levels of service or qualities of service to different subscribers

SUMMARY OF THE INVENTION

It is an object of the invention to enable an improved assignment of values of service attributes to transmissions requested by a user equipment in a radio access network between said user equipment and said radio access network.

This object is reached with the proposed method for assigning values of service attributes to transmissions between a user equipment and a radio access network. Upon request of such a transmission by a user equipment of a subscriber registered with some radio access network, values of service attributes are determined that are to be used for the requested transmission. The values are determined based on the one hand on at least one value of at least one service attribute defined by a stored subscriber specific service profile, and based on the other hand on at least one stored common value of at least one service attribute.

The invention proceeds from the consideration that a variety of interdependent factors determine the most suitable attributes to be used for a transmission between a user equipment and a radio access network. These factors are given in particular by the current request of a user equipment for a specific transmission, by values of service attributes defined by a subscribed service profile and by values of service attributes that are destined to be used in case the user equipment requests a transmission without requesting at the same time specific values or an indication of such values of service attributes. These factors and their interdependencies can be taken into account efficiently, when storing on the one hand a service profile that corresponds to the subscription of a specific subscriber and on the other hand common values of service attributes that are provided for all subscribers. Which of the values of the service attributes are selected for a specific transmission is determined according to a request by a user equipment. The composition of the attributes and their values for a requested transmission can vary from using only values from the subscribed set of values via using partly subscribed and party common values to using only common values, depending on the requested transmission.

With the proposed approach, the kind of the requested transmission and the restrictions given by the subscription can be taken into account, while enabling at the same time that conflicts arising from a combination of requested and subscribed attributes can be avoided In the whole, any kind of request can be taken care of most efficiently, i.e. in particular with a service that is neither worse nor better than what the customer is willing to pay for a specific transmission.

A requested transmission to which values of service attributes are to be assigned can be a transmission in either direction between the requesting user equipment and a radio access network.

Preferably, the values of service attributes defined by a subscriber specific service profile stored in the first storing means and the common values of service attributes stored in the second storing means define the Quality of Service of a transmission. In addition or alternatively, the values for any other kind of attributes that are considered useful by the operator for a transmission can be made available.

Advantageously, the user equipment can request together with a transmission specific values of service attributes for the transmission. These values are taken into account additionally in determining the values that are to be used for the transmission.

In a further advantageous embodiment of the invention, the subscriber specific service profiles stored in the first storing means define the upper limit of values allowed for the service attributes for at least one kind of transmission as subscribed for the corresponding user equipment. In case specific values of attributes are requested by a user equipment, this means that the values requested by the user equipment are determined as values to be used, as long as they do not exceed the values defined by the stored subscriber specific service profile. If a requested value exceeds the corresponding subscribed value, the value to be used for the requested transmission is determined to be the subscribed value.

The subscriber specific values of attributes defined by the profiles stored in the first storing means can comprise in particular the values of attributes defining the quality of service for requested real-time-traffic transmissions. For real-time transmissions, the values of the attributes defined by the subscriber specific profiles stored in the first storing means can also be used as default values, in case not all or no values of service attributes are requested by a user equipment for a requested transmission. Alternatively, but preferably in addition, the subscriber specific values of attributes can comprise the values of at least one attribute constituting part of the quality of service for requested non-real-time-traffic transmissions, in particular values for the traffic handling priority.

Instead of one set of limiting values, it is also possible to store several sets of limiting values, the to be provided set being selected for each transmission according to some characteristic of a requested transmission, e.g. according to the access point used by the user equipment. Moreover, the first storing means may comprise a service degradation profile for each user, which indicates values of attributes to be used in case a transmission cannot be effectuated or maintained at the desired service level even though the subscription would allow the requested service level. Such service degradation profiles are described in detail in the co-pending US patent application titled "Apparatus, and associated method for controlling service degradation performance of communications in a radio communication system", and filed Oct. 28, 1999.

The common values of attributes stored in the second storing means preferably comprise at least one default value for at least one attribute to be used in case the user equipment does not require a specific value for said at least one attribute for a specific requested transmission. In particular, the values of attributes stored in the second storing means can comprise a default value for at least one attribute to be used in case the user equipment does not require a specific value for said at least one attribute for a requested non-real-time transmission. In case values of the other attributes required for this kind of transmission are provided by the subscriber specific profile in the first storing means, it is possible that on the one hand these subscriber specific values are used for the transmission while on the other hand the further required values are retrieved from the second storing means. The transmission can therefore be based on both, common and subscriber specific values, in case the user equipment does not request any values. This is of particular interest for non-real time transmissions, in which case the conformity of the values of a part of the attributes might have to be checked with the subscriber specific profile.

Similar to the first storing means, the second storing means can store one or several sets of common values for at least one attribute. One of the sets can be selected as basis for a transmission for example depending on a group to which the requesting user equipment is assigned, or according to the access point name given by the user equipment. Also the load situation or other information from the radio access network can have an effect on the choice of the to be used set of default attributes. Actually, with such a plurality of sets of common values, it would even be possible to use only the corresponding set of common parameters without adding any information from the first storing means with subscriber specific values, whenever a non-real-time transmission is requested without requesting values for the required service attributes.

According to a first aspect of the invention, the first storing means and the second storing means are part of the same radio access network.

For this first aspect of the invention, the mentioned object of the invention is also reached with a radio access network comprising first storing means for storing subscriber specific service profiles defining values of at least one service attribute that can be assigned to at least one kind of transmission. The proposed radio access network further comprises second storing means for storing at least one common value of at least one service attribute that can be assigned to at least one kind of transmission. Finally, the network comprises processing means for determining values of service attributes to be used for a transmission requested by a user equipment of a subscriber registered with said radio access network based on at least one of the values of service attributes defined by a corresponding subscriber specific service profile stored in the first storing means and on common values of service attributes stored in the second storing means. Corresponding subscriber specific service profile means that it is a service profile stored for the subscriber owning the user equipment requesting the transmission. The requested transmission is then carried out with the determined values of service attributes.

The object is equally reached with a network element for a radio access network comprising storing means corresponding to the second storing means and processing means corresponding to the processing means of the radio access network proposed for the first aspect of the invention.

The employment of the invention in its first aspect can be seen in particular, though not exclusively, with UMTS and GPRS (General Packet Radio Service).

According to a second aspect of the invention, the first storing means are part of a first radio access network in which a user equipment is registered, and the second storing means are part of a second radio access network which is accessed by said user equipment for requesting a transmission.

For this second aspect of the invention, the mentioned object of the invention is reached with a further proposed radio access network in which a user equipment of a subscriber registered with some other radio access network is allowed to request a transmission. The proposed radio access network comprises storing means for storing at least one common value of at least one service attribute that can be assigned to at least one kind of transmission. Moreover, it comprises processing means for determining values of service attributes to be used for a transmission requested by said user equipment based on values of service attributes defined by a subscriber specific service profile received from the other radio access network and on said common values of service attributes stored in said storing means. This radio access network corresponds to the second network mentioned.

The object is equally reached with a network element for a radio access network in which user equipment registered with some other radio access network is allowed to request a transmission comprising storing means corresponding to the second storing means and processing means corresponding to the processing means of the radio access network proposed for the second aspect of the invention. The processing means of the proposed radio access network, however, could be distributed to several network elements. Therefore, the processing means of the network element of the invention can have only a part of the functions of the processing means of the radio access network. In particular it can be designed to provide only an indication of the values of service attributes to be used for the requested transmission by another network element, instead of determining the specific values. The other network element should then be able to assign and use specific values of the required service attributes according to the indication. This network element is part of the second radio access network mentioned.

The user equipment can access the second radio access network either because it is owned by the same operator as the first radio access network or because the operators of the two networks have a roaming agreement and the subscriber owning the user equipment has moreover a roaming agreement with the operator of the network with which he or she is registered. The first network can be in particular a public cellular network and the second network some locally confined network.

The second aspect of the invention is based on the assumption that operators of the respective first radio access network want to be able to provide different levels of service quality for different user equipment roaming into a respective second radio access network. For example, if one group of subscribers or customers of the first radio access network is paying more for a service than another group of customers in order to obtain a better service quality, this information should be available in the second radio access network in order to provide the correct service quality for the customer also when the user equipment is requesting a transmission in the second radio access network.

When a user equipment roams into the second radio access network, the operator of this second network has to know what kind of subscription the user agreed upon with the first radio access network in order to be able to provide the corresponding service. The subscription may include issues like charging and quality of service. A straightforward solution would be to rely on the information the user equipment supplies to the second network. This would be based purely on the applications running on the user equipment and the service they are requesting from the network. For example, if the user equipment starts a real-time application, like a voice or video application, the user equipment would request a high-priority quality of service class for this IP (internet protocol) flow. The network side quality of service control functions would check whether the request could be accepted. A signaling protocol would carry the information on the requested service between the user equipment and the entities of the second network. The problem with this solution is that the information given by the terminals does not necessarily have to correspond to the subscription, i.e. to the service the user is actually paying for.

With the proposed method, radio access network and network element, in contrast, a reliable information is provided to the second radio access network based on which the correct service can be provided. The operator of the first radio access network with which a subscriber using a user equipment is registered stores for each subscriber at least one subscriber specific service profile according to the subscription of the customer. When the user equipment accesses the second radio access network, entities of this second network control the services and local network resources according to subscriber specific service profile information provided by the first radio access network. This way, the operator of the first radio access network is given control over the services and the way the services are charged for also in the second radio access network. In the most simple approach, the subscriber specific information only includes the number of a group to which the subscriber belongs, to each of different groups being assigned a different quality of service. The common values of service attributes, on the other hand, can be maintained locally in storing means of the second network, since they are independent from the subscription of a specific subscriber. Obviously, however, the common values could be stored as well in storing means of the first radio access network and be transmitted to the second radio access network together with the subscriber specific values.

In the second aspect of the invention, the first network advantageously provides the stored profile for a subscriber to the second network when a user equipment of the subscriber is authenticated in order to be allowed to enter the second network. All processing can then be carried out exclusively in the second network, even though the subscriber specific profile is stored permanently only at one place, i.e. in storing means of the network with which the user equipment is registered.

The second radio access network should comprise means for mapping to be employed values of service attributes to the service functions employed in said second radio access network for a requested transmission, since the employed attributes do not have to be identical to the attributes used in the first radio access network. The mapping should take into account received subscriber specific values as well as values requested by the user equipment and stored common values in case no values were requested by the user equipment.

The employment of the second aspect of the invention can be seen in particular, though not exclusively, with a WLAN as second radio access network comprising a second storing means, The first radio access network with which the user equipment is registered can be in particular, though not exclusively, a 3G network.

Preferred embodiments of the invention are included in the subclaims.

BRIEF DESCRIPTION OF THE FIGURES

The invention will be described in the following in more detail with reference to drawings of which.

DETAILED DESCRIPTION OF THE INVENTION

Figure 1:
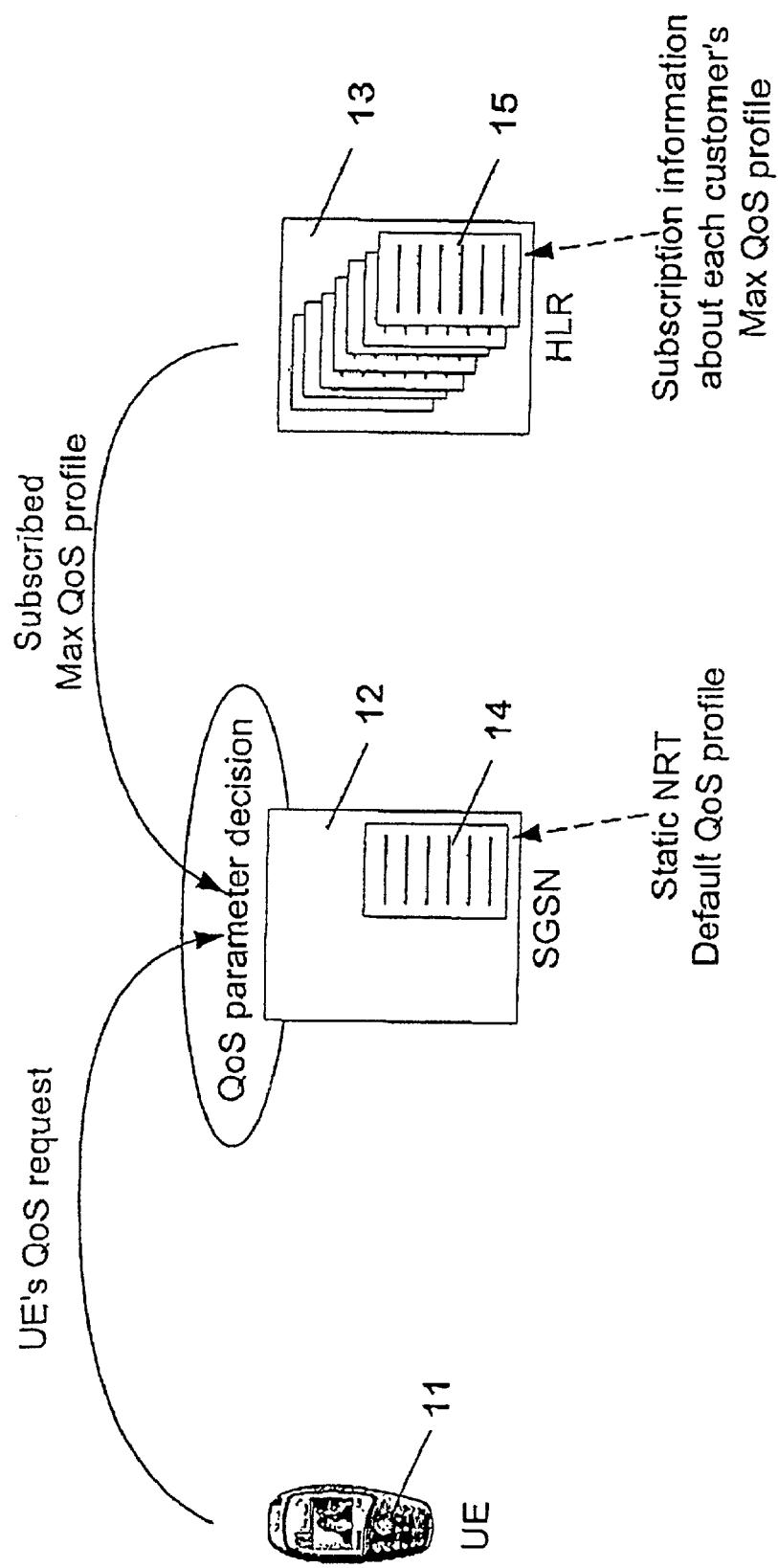
FIG. 1 illustrates an implementation of a method according to the first aspect of the invention.

FIG. 1 illustrates the co-operation between a user equipment UE 11, a serving gateway support node SGSN 12 and a home location register HLR 13 of a UMTS network for assigning values of service attributes to a requested transmission according to an implementation of the first aspect of the invention.

An SGSN is employed in cellular networks for keeping track of the location of each user equipment and for performing security functions and access control. In the SGSN 12 of FIG. 1, a static NRT (non-real-time) and default QoS profile 14 is stored for an additional QoS control function. The profile 14 comprises a single set of common values for some NRT service attributes for all customers. More specifically, values are provided for the delivery order, the maximum SDU size, the SDU error ratio, the residual BER, the delivery of erroneous SDUs, and for the allocation/retention priority. These values are to be used if specific required values of QoS attributes are not indicated by a user equipment for a requested non-real-time transmission, like an interactive or background traffic class transmission. The common values of service attributes are set to some good average of a non-real-time QoS level chosen from the attribute values available for the interactive traffic class.

In the HLR 13, a subscriber specific service profile Max QoS 15 is stored for each customer/subscriber. The service profile 15 includes the best possible value for each QoS attribute according to the subscription of the respective customer. It contains mainly the subscribed values for the different attributes required for a real-time traffic class, either for the conversational or the streaming traffic class, i.e. values for the maximum bitrate, the delivery order, the maximum SDU size, an SDU format information, the SDU error ratio, the residual BER, the delivery of erroneous SDUS, the allocation/retention priority, the transfer delay and for the guaranteed bitrate. In addition, a subscribed value for the traffic handling priority for non-real-time traffic classes is included in each subscriber specific service profile 15 in the HLR 13.

A user equipment 11 desiring a transmission sends a connection request to the SGSN 12. In addition, the user equipment 11 can also transmit desired values of service attributes to the SGSN 12 that are to be used for the requested transmission. Following the request of a transmission by a user equipment 11, the subscriber specific profile 15 for the customer owning this user equipment is transferred from the HLR 13 to the SGSN 12. In case there is still a recently transferred profile 15 for the customer owning the requesting user equipment 11 available in the SGSN 12, a new transmission is not necessary.

Consequently, there are now up to three sets of service profiles accumulated in the SGSN 12. Based on these service profiles, it is then determined in the SGSN 12 which values are to be employed for the different attributes required for the requested connection.

Figure 2:
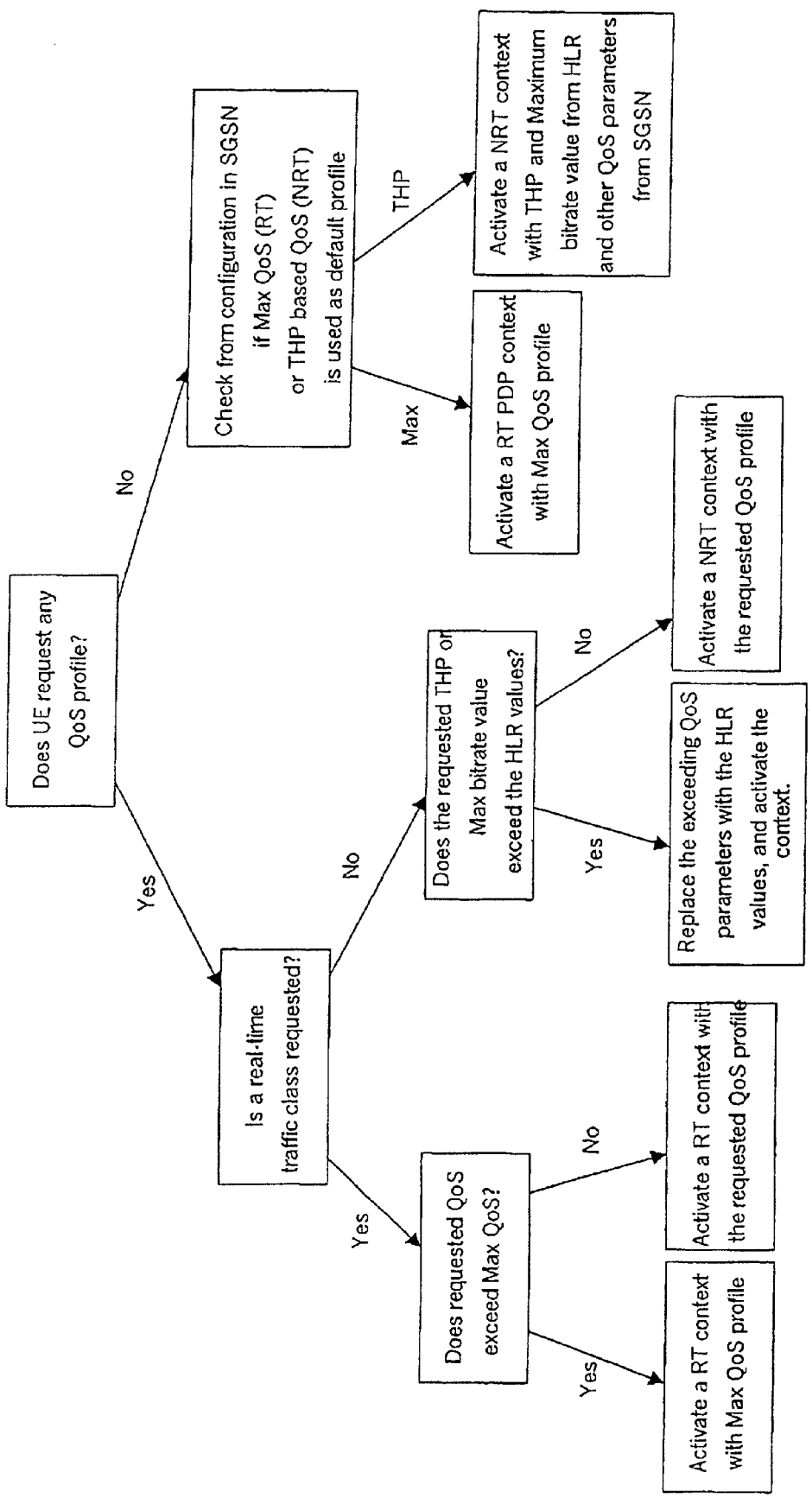
FIG. 2 is a flow chart for the method in the implementation of FIG. 1.

The selection of the values of attributes that are to be used for the requested transmission will now be explained in more detail with reference to the flow chart of FIG. 2.

The user equipment 11 can request a transmission in any of the four available transmission classes, the conversational, the streaming, the interactive or the background traffic class. Moreover, as mentioned above, the user equipment 11 can but does not have to request a desired QoS profile for the requested transmission, After a transmission request has been received by the SGSN 12, it is first determined in the SGSN 12, whether the request by the user equipment 11 contains a request for a specific QoS profile.

In case no specific QoS profile is requested by the user equipment 11, it is checked from the configuration in the SGSN 12 which values of attributes are to be used as default profile for the requested connection. The configuration can be set by the operator of the network and determines whether only the values of attributes stored in the HLR 13 are to be used or if a combination of some of the values of attributes in the HLR 13 and the values of attributes in the SGSN 12 are to be used for a specific requested connection, In the implementation corresponding to the flow chart of FIG. 2, in case the real-time profile is used as default profile, all values in the service profile received from the HLR 13 except for the THP value are selected to be used for the connection. A real-time PDP connection is then activated with these attributes.

In case the non-real-time profile is used as default profile, the values for the THP and for the maximum bitrate in the profile 15 received from the HLR 13 are selected to be used as values of the corresponding attributes for the requested connection. Additionally, the values of the attributes in the profile 14 stored in the SGSN 12 are selected to be used for the remaining required attributes for the connection. A non-real-time connection is then activated with these combined values of attributes.

In case a specific QoS profile is requested by the user equipment 11, the traffic has to be restricted to the subscribed attribute levels. To this end, it is determined in another step in the SGSN 12, whether a real-time or a non-real-time traffic class is requested by the user equipment 11.

In case a real-time traffic class is requested by the user equipment, it is moreover determined in the SGSN 12, whether the requested QoS values exceed the values predetermined in the profile 15 received from the HLR 13, If they do not exceed the predetermined values, a real-time connection is activated with the requested QoS profile. If any of the requested values of attributes exceeds the corresponding subscribed value, however, the real-time connection is activated with the corresponding maximal subscribed value received from the HLR 13.

In case a non-real-time traffic is requested by the user equipment, it is determined in the SGSN 12, whether the requested value for the THP or for the requested maximal bitrate value exceeds the corresponding subscribed value in the profile 15 received from the HLR 13. If they do not exceed the subscribed values, the non-real-time connection is activated with the requested QoS profile. If, however, one of the requested values exceed the subscribed THP or maximum bitrate value, the exceeding values are replaced with the corresponding subscribed attributes received from the HLR 13, and the non-real-time connection is activated with these replaced values. Further attributes for which the values are to be limited could be treated in the same way.

Summarized, the QoS profile stored in the first storing means in the HLR 13 can be adjusted for real-time traffic, while a value of an additional attribute important for non-real-time traffic can be stored together with this profile. When a real-time profile is requested, the values of the required attributes are assembled based only on the values in the profile in the HLR 13 and possibly on requested values. When a non-real-time transmission is requested by the user equipment 11, the QoS profile for this connection is assembled by using some QoS attribute values from the first storing means in the HLR 13 and some from the second storing means in the SGSN 12, considering in addition a possible request of values by the user equipment 11. Thus, the QoS of real-time and non-real time traffic can be controlled separately.

Instead of storing additional values of QoS attributes for non-real-time traffic in the HLR, these values can be obtained in several different ways based on the attributes stored in the HLR for the real-time traffic. Two possibilities will be briefly described as further embodiments of the first aspect of the invention.

In the first alternative, the allocation/retention priority in the received HLR profile is used. Allocation/retention priority is defined in the above mentioned standard 3GPP TS 23.107 as specifying "the relative importance compared to other UMTS bearers for allocation and retention of the UMTS bearer. The Allocation/Retention Priority attribute is a subscription attribute which is not negotiated from the mobile terminal." The SGSN can read the allocation/retention priority attribute from the received HLR QoS profile and then derive the non-real-time value for the THP from it. Both of them have three values 1, 2 and 3.

In the second alternative, the guaranteed bitrate value in the received HLR profile is evaluated in the SGSN, where a mapping of certain bitrate values into certain THP values is defined. For example, a value of 128 kbps for the guaranteed bitrate in the HLR profile can result in the best THP, a value of 64 kbps in the second best THP, a value of 32 kbps in the lowest THP, and a value of 0 kbps can result in a treatment as background class.

It would also be possible to store a complete QoS profile for both, real-time traffic and for non-real-time traffic in storing means. The real-time profile would then limit requested profiles for real-time traffic and the non-real-time profile would limit requested profiles for non-real-time traffic. The NRT profile could be used in addition as default QoS profile for the user equipment in case no profile is requested by the user equipment. This would mean that the first and the second storing means are realized by single storing means.

In a similar way, a dedicated QoS profile can even be stored for each of the four traffic classes for each user equipment in storing means of the radio access network. The user equipment could then for instance define only the traffic class attribute and the rest of the attribute values would be fetched from the corresponding QoS profile in the storing means. The four QoS profiles in such storing means can be adjusted for typical applications using the traffic class in question. For example, the conversational traffic class QoS profile is adjusted to the needs of a typical VoIP (Voice over Internet Protocol) application, the streaming traffic class QoS profile is adjusted for video streaming, the interactive traffic class QoS profile is adjusted for web browsing, and the background traffic class QoS profile is adjusted for best effort file transfer. If the terminal does not request any values of QoS attributes at all, the values for the interactive or the background profile should be used. Therefore, the first and the second storing means are realized again by single storing means in this implementation In case two or even four complete QoS profiles are to be stored for each user equipment in a combined first and second storing means, these storing means are best integrated in the HLR in which the authentication and billing information for the respective user equipment is stored. Upon a transmission request by a user equipment, information can then be added to a signaling from the SGSN to the HLR/HSS about the traffic class that is requested. Based on this information, the HLR can send the correct traffic class QoS profile to the SGSN. Thus, in the SGSN, the received profile simply has to be applied. Another solution would be to transfer all the profiles to the SGSN in the PDP context activation, the correct one being selected in the SGSN according to the request by the user equipment.

Figure 3:
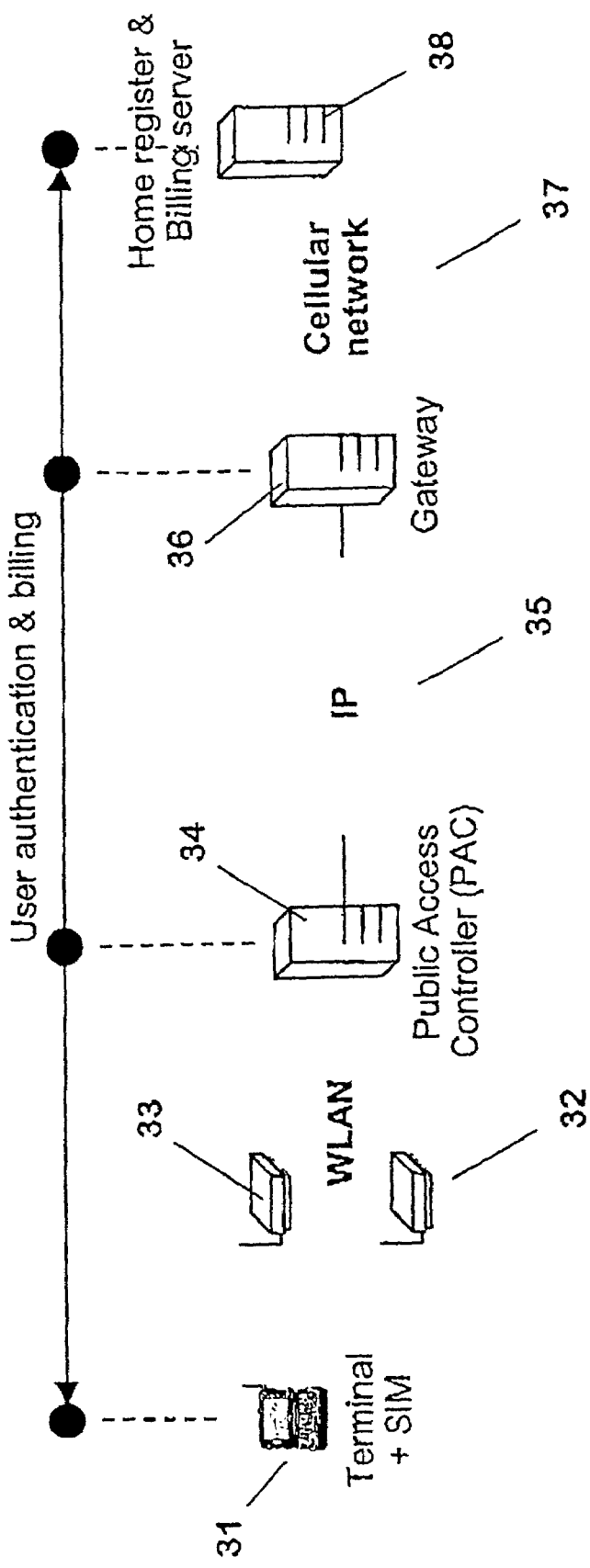
FIG. 3 shows a high-level network architecture for WLAN-cellular interworking.

FIG. 3 shows a high-level network architecture for an interworking of a WLAN and a cellular network, for which architecture an implementation of the second aspect of the invention is to be employed.

In FIG. 3, a WLAN 32 with two access points 33 is depicted. The WLAN 32 is connected via a public access controller (PAC) 34 to a public IP network 35 and further via a gateway 36 to a public cellular network 37, more specifically to a GSM network. The cellular network 37 comprises several home register and billing servers 38, of which one is shown. The WLAN 32 is located at a local wireless hotspot and is provided by a private owner. The operator of the cellular network 37 has a roaming agreement with the operator of the WLAN 32.

A mobile terminal 31 with a SIM (GSM Subscriber Identification Module) is located in the access area of the WLAN 32. The terminal 31 is registered with the cellular network 37. The authentication and billing information for the terminal 31 is stored in the depicted home register and billing server 38. Corresponding information is stored in the SIM of the terminal 31. The terminal 31 has a WLAN roaming agreement with the operator of the cellular network 37.

The authentication and billing information for the terminal 31 accessing the WLAN 32 is transmitted between the WLAN 32 and the cellular network 37 through the gateway 36. Proprietary protocols take care of the signaling between the different network elements. Possible details of an authentication mechanism are e.g. presented in the co-pending US patent application "Authentication in a packet data network" by Jyri Rinnemaa et al, filed Mar. 31, 2000.

The second aspect of the invention presents a possibility of providing to a terminal 31 registered with the cellular network 37 also in the WLAN 32 with the Quality of Service agreed upon with the operator of the cellular network 37.

Figure 4:
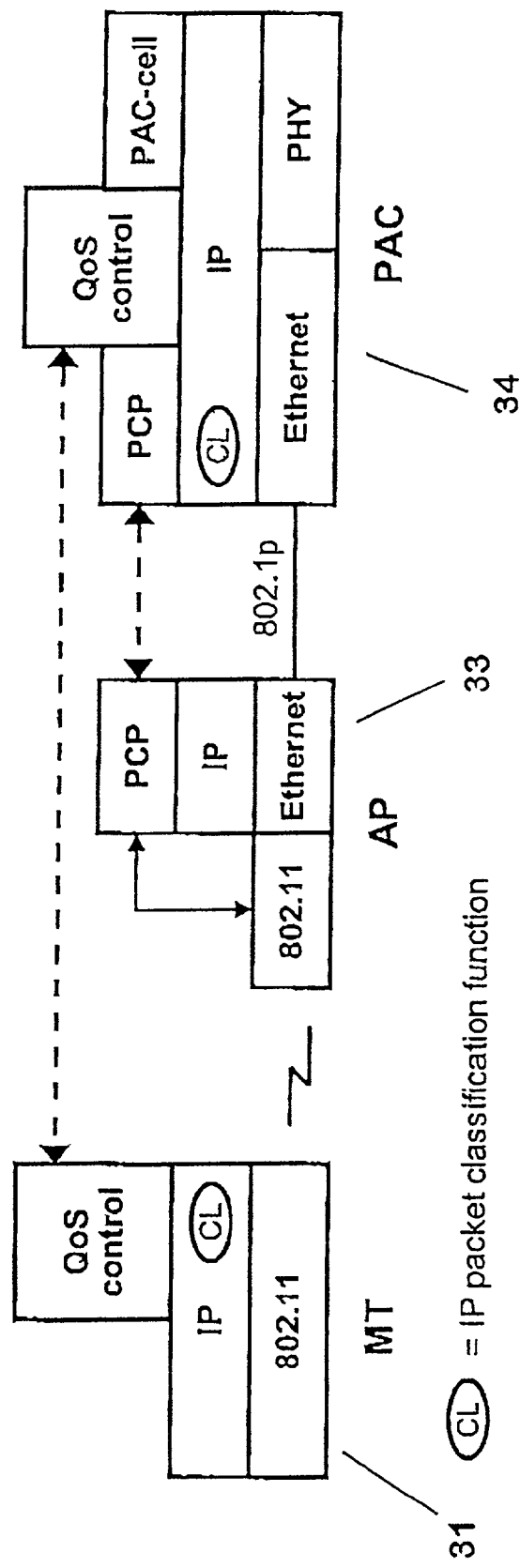
FIG. 4 shows an implementation of a WLAN QoS architecture to be used for the second aspect of the invention.

FIG. 4 illustrates how the service profile information in the home register and billing servers 38 of the architecture of FIG. 3 can be combined with a specific WLAN QoS architecture according to the second aspect of the invention.

The QoS architecture on the WLAN side includes the PAC 34 of the WLAN 32, an access point (AP) 33 of the WLAN 32 and a mobile terminal 31. The PAC 34 is the interface of the WLAN 32 towards the cellular network 37, and the access point 33 provides an access to the WLAN 32 for the mobile terminal 31.

The PAC 34 has on the one hand a physical layer connection PHY to the cellular network 37 and on the other hand an Ethernet connection to the AP 33. Additionally, it comprises an IP processing entity with an IP packet classification function. Further, a PCF (Point Coordination Function) Control Protocol (PCP) entity, a QoS control entity and a PAC-cell entity are provided. In the QoS control entity, a default QoS profile is stored.

The AP 33 comprises on the one hand the mentioned Ethernet connection to the PAC 34 and on the other hand an IEEE 802.11 PCF connection option to mobile terminals. Like the PAC 34, it has moreover an IP processing entity and a PCP entity for a corresponding communication with the PAC 34.

The mobile terminal 31, finally, comprises an 802.11 PCF connection option to an AP 33, an IP processing entity with an IP packet classification function and a QoS control entity for communication with the corresponding entity of the PAC 34.

The control of the QoS of downlink transmissions provided with the presented architecture will now be described.

The mobile terminal 31 is registered with the cellular network 37. Additionally to authentication information, a service profile is stored in a specific home register and billing servers 38 of the cellular network 37. The service profile is based on the subscription information the user of the mobile terminal 31 has agreed upon with the operator of the cellular network 37 for requested transmissions. The actual attributes for which values are comprised in the service profile are determined by the operator. It may contain for example the maximum QoS values that are allowed to be requested by a specific terminal 31.

The mobile terminal 31 roams into the WLAN 32, which is able to provide broadband transmissions for terminals 31 that have a roaming agreement with the cellular operator. First, an authentication of the terminal 31 takes place based on the authentication information stored in the SIM of the terminal 31 and in the home register and billing server 38 of the cellular network 37. At the same time, the subscribed service profile is transmitted from the home register and billing server 38 of the cellular network 37 to the PAC 34 of the WLAN 32. The PAC-cell entity of the PAC 34 is used as control protocol between the PAC 34 and a gateway in the cellular network 37. It is used for transmitting signaling messages from the WLAN 32 to the cellular network 37 and vice versa. For example, user authentication messages are carried by this protocol. Based on the received service profile, the PAC 34 constructs and maintains an IP packet filtering table containing filtering information for all IP flows or users requiring non-default QoS. That means that the IP packet filters are set up dynamically. The IP packet filters may be based in addition on requests sent by the terminal 31 requesting to prioritize certain IP flows. Especially, if the flows are created dynamically with dynamic UDP/TCP ports, it is not possible to fix the IP packet filtering table in advance. The terminal sends the requests using the QoS control protocol.

When a downlink transmission with a specific QoS is requested by the terminal 31, the requested service profile information has to be mapped into the WLAN QoS classes defined for transmissions in the WLAN 32. The provision of a specific QoS is controlled by the QoS control entities in the mobile terminal 31 and the PAC 34. The header of each downlink IP packet received by the PAC 34 contains information indicating a requested QoS for the transmission of the IP packets. Each downlink IP packet is therefore processed in the IP entity of the PAC 34 in order to determine the correct WLAN QoS class to be used for the IP packets. More specifically, the header of each IP packet is processed, and based on the header information and the IP packet filtering information the packet is scheduled for a certain WLAN QoS class.

After the PAC 34 has classified the IP packets, the QoS class, e.g. real-time or non-real-time, is decided. The PAC 34 marks the downlink IP packets according to the classification using 802.1p bits. The p-bits are a part of the Ethernet frame header and can therefore be used for marking different QoS classes at the Ethernet level.

When a downlink transmission without a specific QoS is requested by the terminal 31, the p-bits can be marked according to the stored default profile when the received IP packets have been classified.

The marked IP packets are received via Ethernet by the access point 33, which is designed to be able to read the 802.1p bits and to understand the different QoS classes and the corresponding p-bit patterns. The AP 33 is thereby able to schedule the downlink packets according to the 802.1p bits, while no user-plane IP packet processing is required in the AP 33. The IP packets are simply mapped from the Ethernet frames to the queue of the correct WLAN QoS class.

In addition, a PCP is employed between the PAC 34 and the AP 33 for controlling the transmission between the AP 33 and the mobile terminal 31 by the 802.11 connections. The QoS control protocol in the PAC 34 uses PCP to control the PCF function in the AP 33, i.e to update the PCF polling list.

The WLAN QoS control functions in the QoS control entity of the PAC 34 take care of the IP packet QoS, as well as the radio link packet scheduling. Moreover, the QoS control functions can have an interface to application level control protocols, like SIP and H.323, in order to be able to receive information of certain IP flows and their QoS requirements. SIP is an SMDS (switched multimegabit data services) interface protocol and H.323 is an ITU-T set of standards for packet-based multimedia networks allowing VoIP services to connect to traditional circuit-switched voice networks. The subscriber specific service profile information received by the cellular network 37 can be used for prioritizing certain user equipments, or certain applications, or be used as an input for the admission control function.

While downlink packet classification is carried out in the PAC 34 of the WLAN 32, uplink packet classification takes place in the IP entity of the mobile terminal 31.

Thus, the cellular operator can define service profiles for users having a WLAN roaming agreement with the operator. The WLAN entities control the access to local and external network resources according to the subscriber specific service profile information defined in the cellular network. This way, the cellular operator can have control over the services and the way the services are charged for when users are roaming into WLAN hotspots.

As one alternative to the QoS control described with reference to FIG. 4, a simple traffic control mechanism can be implemented in the PAC 34. To this end, a certain amount of traffic that a user is allowed to receive is stored as a value of one of the attributes in the service profile which the PAC 34 receives from the cellular network 37 during user authentication. The PAC 34 can then control the downlink traffic of the users according to the allowed amount of traffic The users can for example be categorized into three groups, each group having a certain traffic limit with a certain price. If a user exceeds the traffic limit, the PAC 34 starts dropping the excess traffic. This is a simple mechanism that can be used for prioritizing different users.

What is claimed is:

1. A method for assigning values of service attributes to transmissions between a user equipment and a radio access network, comprising upon request of such a transmission by a user equipment of a subscriber registered with some radio access network determining values of service attributes to be used for the transmission requested by said user equipment based on at least one value of at least one service attribute defined by a stored subscriber specific service profile, and based on at least one stored common value of at least one service attribute;

wherein a first storing means are part of a first radio access network, wherein a second storing means are part of a second radio access network, said first radio access network being a network for which a user equipment requesting a transmission is registered and said second radio access network being accessed by said user equipment for requesting the transmission; and wherein values of service attributes to be used for a requested transmission in the second radio access network are determined by mapping values of service attributes determined based on values of service attributes as far as requested by a user equipment for a requested transmission, on subscriber specific values of service attributes and on common values of service attributes, which service attributes are defined in the first radio access network, to values of service attributes defined in the second radio access network.

2. The method of claim 1 wherein the values of service attributes to be used for the requested transmission are determined further based on values of service attributes requested by the user equipment.

3. The method of claim 1 wherein the values of service attributes defined by a subscriber specific service profile stored in the first storing means and the values of service attributes stored in the second storing means define the Quality of Service of a transmission.

4. The method of claim 1 wherein the values of service attributes defined by a subscriber specific service profile stored in the first storing means define the best values allowed for the service attributes for at least one kind of transmission as subscribed by the corresponding user equipment.

5. The method of claim 1 wherein the values of service attributes defined by a subscriber specific service profile stored in the first storing means comprise the values of service attributes defining the Quality of Service for requested real-time-traffic transmissions.

6. The method of claim 1 wherein the values of service attributes defined by a subscriber specific service profile stored in the first storing means comprise the values of at least one service attribute defining at least part of the Quality of Service for requested non-real-time-traffic transmissions.

7. The method of claim 1 wherein the common values of service attributes stored in the second storing means comprise at least one default value for at least one service attribute to be used in case a user equipment requests a transmission without requesting a specific value for said at least one service attribute required for the requested transmission.

8. The method of claim 1 wherein said first and said second storing means are part of the same radio access network.

9. The method of claim 8 wherein said radio access network is a UMTS radio communications network.

10. The method of claim 1 further comprising transmitting the values of service attributes defined by a subscriber specific service profile stored in the first storing means from said first radio access network to said second radio access network during an authentication of said user equipment accessing said second network.

11. The method of claim 1 wherein said second radio access network is a wireless local area network (WLAN).

12. A radio access network in which a user equipment of a subscriber registered with some other radio access network is allowed to request a transmission, comprising:
- storing means for storing at least one common value of at least one service attribute that can be assigned to at least one kind of transmission;
- processing means for determining values of service attributes to be used for a transmission requested by said user equipment based on values of service attributes defined by a subscriber specific service profile received from the other radio access network and on said common values of service attributes stored in said storing means;
- wherein the processing means are designed for mapping values of service attributes determined, based on values of service attributes as far as requested by a user equipment for a requested transmission, on subscriber specific values of service attributes and on common values of service attributes, which service attributes are defined in the other radio access network, to values of service attributes defined in the radio access network.

13. The radio access network of claim 12 wherein said radio access network is a wireless local area network (WLAN) and wherein said second storing means and at least part of said processing means are integrated in a public access controller (PAC) of said wireless local area network.

14. A network element of a radio access network in which a user equipment of a subscriber registered with some other radio access network is allowed to request a transmission, comprising;
- storing means for storing at least one common value of at least one service attribute that can be assigned to at least one kind of transmission;
- processing means for determining values or an indication of such values of service attributes to be used for a transmission requested by said user equipment based on values of service attributes defined by a subscriber specific service profile received from the other radio access network and on the common values of service attributes stored in said storing means;
- wherein the processing means are designed for mapping values of service attributes determined, based on values of service attributes as far as requested by a user equipment for a requested transmission, on subscriber specific values of service attributes and on common values of service attributes, which service attributes are defined in the other radio access network, to values of service attributes defined in the radio access network.

* * * * *